UNITED STATES PATENT OFFICE.

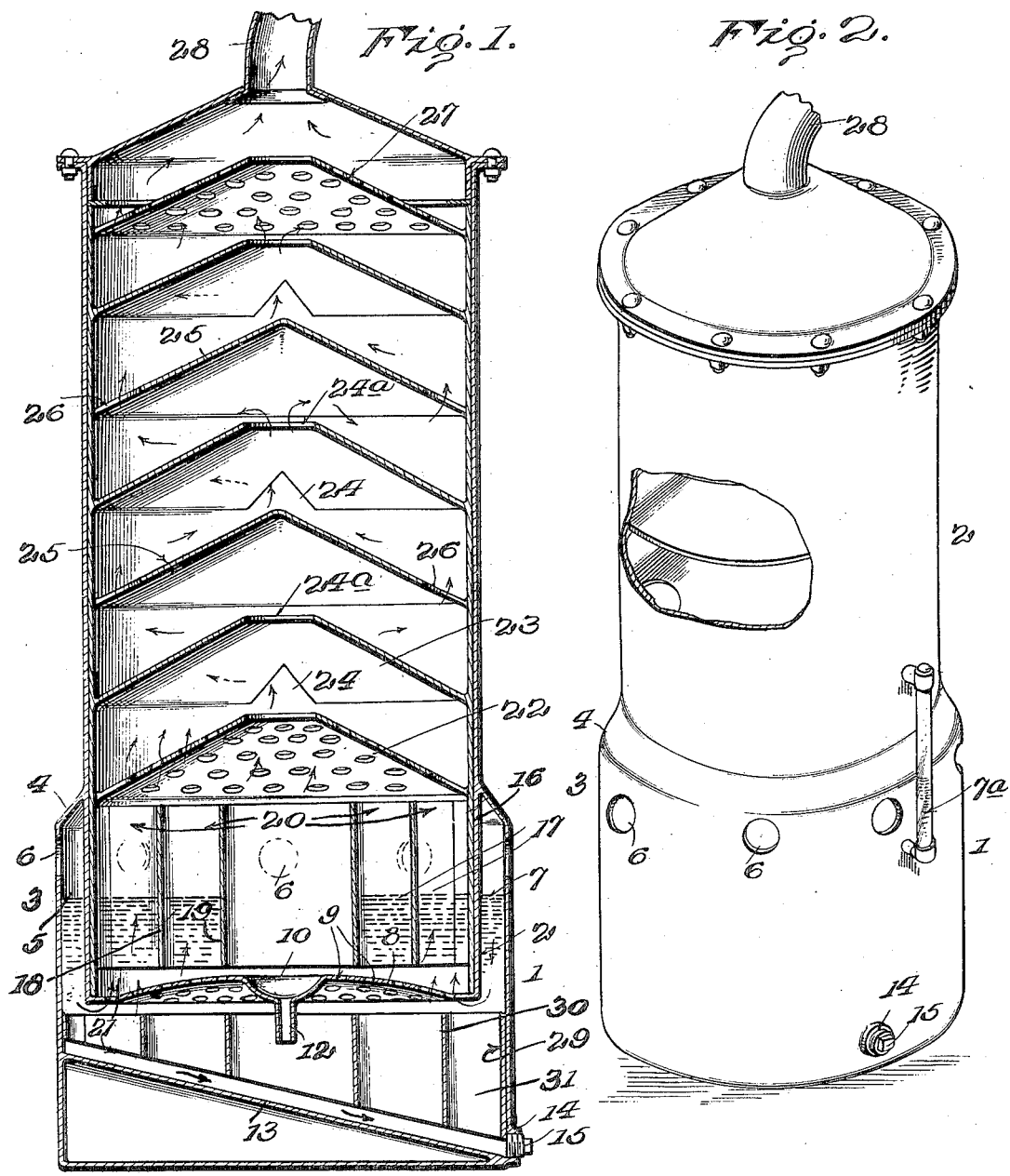

VITO DI SANTE, OF WICHITA, KANSAS.

AIR-FILTER.

1,390,096.　　　　Specification of Letters Patent.　　Patented Sept. 6, 1921.

Application filed December 4, 1919. Serial No. 342,471.

*To all whom it may concern:*

Be it known that I, VITO DI SANTE, of Wichita, in the county of Sedgwick and State of Kansas, have invented certain new and useful Improvements in Air-Filters; and I do hereby declare the following to be a full, clear, and exact description of the invention, such as will enable others skilled in the art to which it appertains to make and use the same.

In Letters Patent 1,288,393 issued to me December 17, 1918, I have shown and described an air filter for attachment to the air inlet of the carbureter of an internal combustion engine. The invention had primary reference to the closure at the bottom of the collecting vessel consisting of a pair of superposed perforated plates having their openings out of alinement and adapted to be separated by the suction.

In Letters Patent 1,319,574 issued to me October 21, 1919, I have retained the double plate structure covered by the earlier patent but in association with a preferred means for gradually effecting the separation of the water from the air in successive stages.

My present invention dispenses with the double plates of the earlier patent and contemplates a collecting vessel of improved design equipped with the conical separating plates of the later patent referred to.

Figure 1 is a vertical section of an air filter constructed in accordance with my invention and Fig. 2 is a perspective.

Fig. 3 is a horizontal section taken through the ports 6, Fig. 1.

I make the water container 1 and the collecting vessel 2 in one integral structure, the vessel extending downward into the container and the outer wall 3 of the water container formed with a shoulder 4 to space it apart from the lower portion of the collecting vessel as at 5. The wall 1 is formed with air openings 6 shown located just below the shoulder 4 and 7 indicates the water level in the container. 7ª is a gage.

The bottom 8 of the collecting vessel constituting an auxiliary water separator is preferably of concavo convex formation and formed with a plurality of perforations 9. At its center I have shown the vessel formed with an imperforate cupped recess 10 from the open bottom of which extends a short pipe section 12. In practice the impurities which are carried by the air gradually contaminate the water. I desire to promote the return of this water from the separating elements. This purpose is aided by the described formation of the bottom of the collecting vessel. The water will enter the cupped recess 10 and, not being interfered with there by the suction, will pass down through the pipe 12 into the body of water within the container 1.

I also provide for readily emptying the container preparatory to supplying it with fresh clean water. This has not been easily accomplished when the filter is attached to an automobile standing on other than a level surface. For this purpose I equip the container with a false bottom 13 slanted from one side at a point near the bottom of vessel 2 to the bottom of the opposite side of the container 1. At the lower end of this false bottom the wall of the container has an outlet 14 threaded to receive a plug 15.

The means for allowing the air and water, or other liquid, to pass through the filter yet gradually arrest the water in successive stages and return it to the container, is substantially like that shown in Letters Patent 1,319,574 of October 21, 1919. A chamber 16 is arranged just above the bottom of the collecting vessel and formed with a series of compartments 17. It is cylindrical and contains two inner concentric walls 18, 19, the circular spaces formed by the walls being divided by partitions 20, as in my Patent 1,319,572, of October 21, 1919. This prevents splashing when traveling over rough roads. The outer wall 18 fits snugly against the wall of the vessel 2 but is extended so as to rest upon the bottom of the vessel and maintain a space 21 between the bottom of the vessel and the chamber and also allow for the convex surface of the bottom 8.

Above the chamber 16 I have shown a perforated main separator cone 22 having an opening in its top in vertical line with the cupped recess 10 of bottom 8, and in superposed series above this cone is an alternating series of separator cones 23 having notches 24 in their edges and openings 24ª in their tops, while an intermediate series of cones 25 have notches 26 in their edges disposed at right angles to notches 24 and are closed at their tops. A second perforated cone 27 is shown at the top of the series and having a central outlet in line with the pipe 28 leading to the carbureter.

The series of separator cones having their lowermost unit 22 directly above the chamber 16 and perforated and formed with an opening in its top in vertical line with the cupped recess 10, aids in quickly returning the water. The cupped recess 10 materially breaks the suction directly above it within the innermost concentric wall. This permits considerable water to pass into the recess from the opening in the top of cone 22.

In the space between the false bottom 13 and bottom 8 of vessel 2, and out of contact with both I have shown a baffle to prevent splashing. This consists of a pair of concentric rings 29, 30, and partitions 31, the outer ring 29 being secured to the wall of the water container. It is preferably made as illustrated in my Patent 1,319,572. This baffle is slanted to conform to the false bottom. When the plug 15 is removed the water will drain through the compartments of the baffle and out over the false bottom.

I claim as my invention:

1. In an air filter, a water container, a collecting vessel within said container, said vessel having a concavo-convex bottom formed with perforations, and a cylindrical chamber above said bottom comprising concentric walls and radial partitions, the outer wall of said chamber being extended to rest upon the bottom of said vessel and maintain a space between the chamber and the bottom of the vessel.

2. In an air filter, a water container, and a collecting vessel within said container, said vessel having a perforated bottom and a central cupped recess having imperforate walls and an outlet in its bottom.

3. In an air filter, the combination with a water container having a slanted false bottom provided with an outlet, a space above said bottom, and a baffle within said space, of a collecting vessel within said container above said baffle, said vessel being equipped with a perforated bottom having a cupped recess formed with imperforate walls, and a pipe leading from said recess to the subjacent baffle space of the container.

4. In an air filter, the combination with a water container, a collecting vessel within said container having in its bottom wall an auxiliary water separator consisting of an imperforate cupped recess provided with an outlet, of a main water separator comprising a chamber in said vessel having concentric walls and partitions forming compartments, a superposed series of separator cones above said chamber, the lowermost separator cone of said series being perforated and having an opening in its top in vertical line with the space defined by the innermost concentric wall of said chamber and in line with said cupped recess.

In testimony whereof I have signed this specification.

VITO DI SANTE.